Patented Dec. 31, 1935

2,026,255

UNITED STATES PATENT OFFICE 2,026,255

ABRASIVE

Gilbert E. Seil, Cynwyd, Pa., assignor to E. J. Lavino and Company, Philadelphia, Pa., a corporation of Delaware No Drawing. Application May 27, 1935, Serial No. 23,710. In Canada October 24, 1934

9 Claims. (Cl. 51—280)

This invention relates to the manufacture of a partly prepared novel material from chrome ore. The object of the invention is to produce from chrome ore a substance which is useful as an abrasive.

To that end, the invention resides essentially in the treatment of chrome ore to recrystallize the chromite component of the ore in a manner to bring about the re-forming, rearrangement and redistribution of that component, and a modification of the gangue component of the ore to produce a chrome ore material having novel and unexpected physical and chemical characteristics.

The primary component of chrome ore, that is, the chromite itself, comprises a definite chemical entity in which the molecular sum of the magnesium oxide plus the iron oxide, acting as bases, equals the molecular sum of the chromic oxide and the aluminum oxide, acting as acids. The primary component has a hardness of 5 to 5.5 on the Moh scale. When subjected to the treatment encountered in use as abrasives, the crystal grains of chromite in their natural form would have a tendency to wear into smooth hard surfaces instead of breaking in such a manner as to expose fresh sharp edges. The secondary component, or gangue of the ore, is relatively soft as it consists chiefly of magnesium silicates, and contains some impurities such as lime, iron oxide, nickel oxide, boric oxide, alumina, etc. While the secondary component in chrome ores is usually composed of magnesium silicates, the individual piece of ore may contain several different magnesium silicate minerals varying in composition from $3MgO.2SiO_2$ to $2MgO.3SiO_2$ with melting points between 2300° F. to 2600° F., and this component comprises from 25% to 10% of the raw ore. These silicates are quite active chemically at high temperatures. They are not in any way stable either physically or chemically. Thus in chrome ore, there is one component which is crystalline and in which good abrasive qualities can be developed but there is also another component which is relatively soft as compared to the first component, and to make matters even worse, there are concentrations of this softer component in normal chrome ores which if they were allowed to remain would offset or lessen the advantages of the abrasive properties developed in the chromite component.

The correct placement and distribution of this secondary component therefore becomes important. The physical placement thereof is more important than the percentage thereof. If the secondary component is so placed in the product (or material) that it is homogeneously distributed, and there is no appreciable thickness of secondary component at any one point, then the physical and particularly the abrasive properties of the mass are substantially equal to the physical properties of the primary component, because the volume of the individual particle of the secondary component compared to the volume of the individual particle of the primary component makes the secondary component of infinitesimal value as far as the abrasive properties of the body, considered as a whole, are concerned.

If on the other hand the relatively soft secondary component occurs in sizable portions, the wearing away of these portions will weaken or lessen the abrasive qualities of the body, so that with the normal and natural distribution of the secondary component, the abrasive and wear resisting properties of the mass are far inferior to similar properties of the mineral chromite.

By the method disclosed in this invention the secondary component is so distributed that infinitesimally thin layers of the secondary component cover all the available surfaces of the recrystallized primary component and are therefore substantially ineffective for practical purposes in affecting deleteriously the hardness and fracturability, and thus the abrasive properties of the finished abrasive.

Accordingly, it has been found that the desirable characteristics of the ore are increased and improved for use as an abrasive material if the raw chrome ore, or concentrated chrome ore, is first subjected to a heat treatment whereby the original placement of the gangue material (secondary component of the ore) is corrected by heating the ore to the melting point of its gangue or secondary component in a manner to change or convert the crystalline nature of said component into a product having glassy characteristics insofar as its softening is concerned. Crystalline substances differ from glasses in their method of melting, particularly in the range of temperature required to change from their solid state to that of a mobile liquid. In crystalline bodies this change occurs at a definite temperature, while in glass-like bodies, there is a range of temperature over which softening takes place progressively, and this range varies considerably with different bodies.

So, it is not only required to convert the gangue component of the ore into a glass-like substance having a softening temperature range in contradistinction to a sharply defined melting point but it is requisite to bring this change about under conditions of mobility of the gangue which cause a change of physical placement or redistribution thereof with respect to the primary component of the ore so that at no place is there any appreciable quantity or concentration of the gangue present. That is, the gangue material is thus uniformly adsorbed and/or absorbed by the chromite component of the treated ore, or ore concentrate.

The reformation or rearrangement of the raw material, so that the abrasive characteristic of the ore mass is improved, is, so far as is now known, best attained by subjecting the raw materials to pre-heat-treatment at a more or less critical temperature. For example, if chrome ore or a mixture of chrome ores, is treated in a rotary kiln at a temperature of about or above 3100° Fahrenheit, reactions, physical changes, and chemical and molecular rearrangements take place, whereafter the chemical rearrangements are in equilibrium, all changes which are caused by heating have taken place, and the material is fixed and stabilized.

Those non-abrasive materials originally contained in the gangue, e. g., impure magnesium silicates, have by this process been subjected to absorption and/or adsorption by the chromite and have undergone complex chemical reactions, so that they are no longer effective as in the usual meaning of the term. When the prepared or processed material is cooled after the heat treatment, there is no deleterious restoration of the previous gangue relationship thereto.

When, in accordance with the present invention, the natural chrome ore or a concentrate thereof, is treated, by heating it to a temperature at least as high as 3100° F., there occurs a definite migration of the gangue materials and also a change of their relation to each other and to the chromite particles, so that the gangue will be found distributed uniformly over the surfaces of as well as adsorbed and/or absorbed by the particles of chromite. In fact, this distribution results in a homogenous placement of the gangue with respect to the chromite, and is so complete and uniform that the gangue materials cannot after treatment be detected with a microscope or other present known optical methods. In addition to the homogeneous placement of the gangue materials, complex physical and chemical rearrangements take place so that no further changes will be met with during subsequent use thereof.

The process of the present invention, due to the distribution of the gangue through the product (or material, or body) and the recrystallization of the chromite to give the latter observably different properties so alters the gangue material that it does not function detrimentally in the finished abrasive. For example, in Cuban ore, the treatment has converted the magnesium silicates of the gangue from crystalline bodies to a glass. The original gangue due to its crystalline nature has a definite sharp melting point and an unalterable crystalline form. The gangue in this case remains solid until the melting point is reached and then becomes liquid immediately. After the natural ore has been subjected to the treatment of the present invention, the crystalline gangue is converted to a glass of variable composition with no definite physical structure and a softening point which spreads through a large range of temperature in contradistinction to the sharp melting point of the crystalline gangue. The glassy gangue does not become a mobile liquid until the temperature is raised very far above the softening point. From the softening point to the temperature at which it becomes a mobile liquid, there is a definite increase in fluidity usually directly proportional to the temperature rise. When it is borne in mind that in the finished abrasive the gangue is present as a glass, it will be seen that the prestabilization which converts it to the glass is a marked advantage in its subsequent use as an abrasive because the grains of treated ore have a type of cleavage such that when a particle or grain thereof breaks, it breaks off in thin plates and thereby furnishes new sharp cutting edges.

As an example of the manner in which my process may be carried out, in producing an abrasive one proceeds as follows:

The raw material, crude or concentrated chrome ore, or a mixture of such chrome ores, with or without the addition of corrective materials, is heated in a rotary kiln in the usual oxidizing atmosphere at a temperature sufficient to effect the recrystallization. This temperature is preferably about or above 3100° Fahrenheit. This treatment is continued until the raw material has been recrystallized and the reactions and chemical and molecular rearrangements are in equilibrium. On completion of the heat treatment the product is cooled. This is accomplished, if desired, by quenching it in water directly on discharge from the kiln. However, the longer the high temperature is maintained and the slower the mass is cooled, the tougher the material becomes.

Following cooling, the treated material is ground in a manner to give the desired characteristics to the particles in respect to dimensional relationships, mesh ratio, and surface condition. For this purpose there may be used roll crushers, hammer-mills, ring roll mills, ball mills and rod mills. The grinding may be done either wet or dry, it all depending upon the desired particle shape and the surface condition thereof, since these characteristics are controlled by the mode of grinding used. In a rubbing mill, for instance, the surfaces are roughened or abraded and the type of adherence between the bond and the abrasive material is different from that obtained in another type of mill. The surface condition is an important factor because it determines the capillarity of the grains.

If it is desired to more completely control the toughness of the abrasive particles, or to vary the toughness thereof, the ground or crushed material can be given further heat treatment with subsequent cooling, it being remembered that the slower the cooling, the tougher will be the final abrasive product.

In brief, therefore, as the result of this process there is obtained an identifiably or recognizably recrystallized chromite of the same chemical structure, having more uniform color, texture and optical properties than that encountered in natural chrome ore plus a distribution of the secondary component (gangue) over the surfaces of the recrystallized chromite in infinitesimal small layers. During the process, the gangue is completely melted to a mobile liquid which causes it to be distributed on or about and absorbed and/or adsorbed by the crystal faces of the recrystallized chromite.

The chromite crystals are thus hardened and toughened in the treatment, the hardness now being 8.5 on the Moh scale and their true specific gravity ranges between 3.95 and 4.05. The toughness of the crystals is controlled by the rate of cooling thereof and the final product instead of wearing smooth, breaks into thin plates, continually exposing new, sharp, cutting edges, as it is used for abrasive purposes.

The term "crude ore" has been used in the specification and claims in the broad sense as including a raw mineral as mined, a mineral which has been milled or concentrated, or a mineral which has not received a treatment by which the herein described stabilization has taken place.

I claim:

1. A new abrasive material comprising heat treated and cooled chrome ore material containing chromite and its accompanying gangue, wherein the chromite particles are recrystallized and the gangue material is so distributed over the surfaces of the recrystallized particles of chromite that at no place is there a concentration of gangue present.

2. An abrasive material according to that of claim 1 in which the gangue material has acquired glass-like characteristics instead of crystalline characteristics.

3. An abrasive material according to claim 1 in which the recrystallized chromite particles are relatively small, and the gangue covers the chromite particles in the form of a thin film.

4. An abrasive material according to claim 1 in which the recrystallized chromite particles are relatively small and the gangue covers the chromite particles in the form of a thin film, which film is practically incapable of detection, such as by present known optical methods.

5. A new abrasive material comprising heat treated, cooled and ground chrome ore material containing chromite and its accompanying gangue, wherein the chromite particles are recrystallized and the gangue material is so distributed over the surfaces of the recrystallized particles of chromite that at no place is there a crystallization of gangue present, with said abrasive material having a hardness of approximately 8.5 on the Moh scale.

6. The process of making a new abrasive from chrome ore material, which comprises recrystallizing the chromite component of the ore into particles, converting the gangue component of the ore to have glass-like melting characteristics instead of having crystalline melting characteristics and redistributing the converted gangue material from zones of concentration to be free from concentration so that each recrystallized chrome particle is covered with a thin film of the gangue by virtue of exposing said chrome ore material to a temperature of at least 3100° F., cooling said heated material, and then grinding said cooled material in a suitable grinding instrumentality to give the surface condition desired on the abrasive particles.

7. The process according to claim 6 with the addition of controlling the cooling for the purpose of varying the toughness of the final abrasive product.

8. The process according to claim 6 in which the ground abrasive is exposed to further heat treatment with subsequent cooling in order to vary the toughness thereof.

9. An abrasive material consisting essentially of recrystallized chrome ore.

GILBERT E. SEIL.